United States Patent Office 2,806,119
Patented Sept. 10, 1957

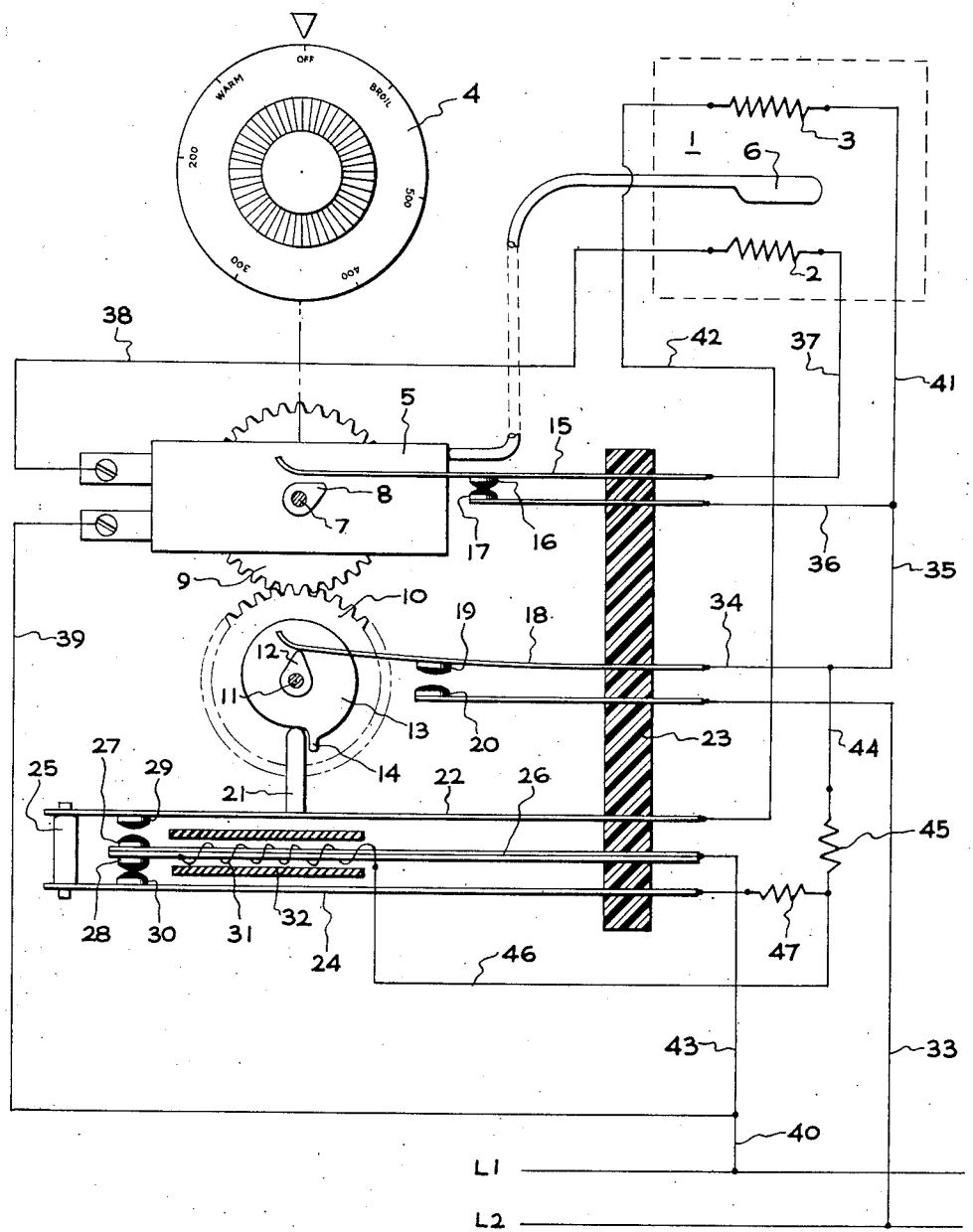

2,806,119

OVEN HEATING SYSTEM

Milton S. Williams, Jr., Louisville, Ky., assignor to General Electric Company, a corporation of New York Application December 15, 1954, Serial No. 475,524

5 Claims. (Cl. 219—20)

This invention relates to electric oven heating systems and has as its principal object the provision of a system of this character having improved automatic preheating means controlled in accordance with the temperature of the oven so that heat at a high output level is supplied to the oven until the desired oven temperature is reached.

Further objects and advantages of the invention will become apparent as the following description proceeds, and the features of novelty which characterize the invention will be pointed out with particularity in the claims annexed to and forming a part of this specification.

Briefly stated, in accordance with one aspect of my invention I provide an oven heating system including a contact carrying thermo-responsive assembly movable throughout a range of positions in accordance with the temperature in the oven, a cooperating contact carrying assembly positionable by manually actuated temperature selecting means, and circuit connections adapted to increase the heat output level in the oven so long as the contacts carried by these assemblies are in engagement.

For a better understanding of my invention reference may be made to the accompanying drawing in which the single figure is a diagrammatic view of an oven heating system constructed in accordance with my invention.

Referring to the drawing, the numeral 1 designates an oven provided with heating units 2 and 3 which are associated therewith so as to supply heat to the oven enclosure. My invention is particularly applicable to electric range ovens and hence oven heating unit 2 will be referred to herein as a baking unit while heating unit 3 will be referred to as a broil unit. In ovens of this type bake unit 2 is customarily located adjacent the bottom wall of the oven while broil unit 3 is generally located adjacent the top wall thereof so as to supply radiant heat to food supported on a rack located in the midportion of the oven enclosure. However in some ovens a portion of bake unit 2 may be located in the top or along the sides of the oven and it is to be understood that my invention is equally applicable to such arrangements.

The heating units in oven 1 are, in the present embodiment, controlled by a single knob or member 4 provided with an off position, a range of temperatures corresponding to the range of baking temperatures which may be attained within the oven, and a broil position. Knob 4 operates a suitable oven thermostat 5 having a temperature sensing bulb 6 located in oven 1. One oven thermostat which may be adapted for use in the present invention is disclosed in Patent 2,260,014—Ettinger. As diagrammatically shown in the drawing, knob 4 is mounted on the shaft 7 of thermostat 5 so that the temperature setting of the thermostat may be made by manual rotation of the knob. Also secured to shaft 7 are a cam 8 and a gear 9 which meshes with a similar gear 10 mounted on a parallel shaft 11. Shaft 11 carries a cam 12 and also a cam 13 which is provided with a stop portion 14, it being noted that all of the elements mounted on shafts 7 and 11 are shown in the "off" position, as indicated by knob 4.

Cam 8 cooperates with a flexible switch arm 15 on which is mounted a movable contact 16 cooperating with a fixed contact 17. Cam 12 cooperates with a similar switch arm 18 on which is mounted a movable contact 19 cooperating with a fixed contact 20. Contacts 16 and 17 are connected in series with bake unit 2 and are normally closed, being opened only when knob 4 is rotated to the broil position, while contacts 19 and 20 are in series with the oven heaters and are also normally closed, being opened only when knob 4 is in its off position.

Cam 13 cooperates with a cam follower 21 secured to a movable contact carrying arm 22 which projects from an insulated base member 23. Also mounted on base 23 is a movable contact carrying arm 24 parallel and similar to arm 22 but spaced therefrom so as to provide space for an intermediate contact carrying member to be hereinafter described. The free ends of arms 22 and 24 are secured together by means of an insulated link 25 so that they are moved together in fixed spaced apart relationship by cam follower 21.

Interposed between arms 22 and 24 is a thermo-responsive member in the form of a bimetallic arm 26 secured at one end to base 23 and constructed so as to move downwardly (as viewed in the drawing) upon an increase in its temperature. Mounted on opposite sides of bimetallic arm 26 are contacts 27 and 28 which cooperate with contact 29 on movable arm 22 and contact 30 on movable arm 24 respectively. Contacts 29 and 30 are spaced apart sufficiently to prevent engagement of contacts 27, 29 simultaneously with engagement of contacts 28, 30, although the spacing is such that a relatively slight movement is required to disengage one pair of contacts and engage the other. Mounted in heat transfer relation with thermo-responsive member 26 is an electric heating element 31, which may be in the form of a coiled resistance wire. To increase the thermal mass of the assembly including arm 26 and heater 31 (for a purpose hereinafter explained) it may be desirable to partially enclose heating element 31 with insulating material 32 as shown.

Referring now to the electrical circuit connections of the present invention, bake unit 2 is energizable from power source $L_1$, $L_2$ by a circuit which includes wire 33 between line $L_2$ and contacts 19 and 20, wire 34, wire 35, wire 36, contacts 16 and 17, wire 37 connected to one terminal of the bake unit; and wires 38, 39, and 40 connecting the other terminal of the unit to line $L_1$ through thermostat 5.

Broil unit 3 is energized by means of a circuit which includes wire 33 between power supply line $L_2$ and contacts 19, 20, wires 34, 35, and 41 to one terminal of the broil unit, and from the other terminal through wire 42, contacts 27 and 29, and wires 43 and 40 to power supply line $L_1$.

Heating element 31 is connected in parallel with bake unit 2 and broil unit 3 so as to be energized simultaneously therewith, its circuit being traceable from power line $L_2$ through line 33, contacts 19 and 20, wire 44, resistor 45, wire 46, to one terminal of heater 31, and back to line $L_1$ through arm 26, wire 43, and wire 40. Finally, since it may be at times desirable to reduce the wattage output of heating element 31 I provide a shunting resistor 47 which is connected in parallel with heater 31 when contacts 28 and 30 are closed, the arrangement being such that upon closure of these contacts the current is divided between heater 31 and resistor 47.

In accordance with an important aspect of my invention bimetallic arm 26, heating element 31, insulation 32 and resistor 45 are constructed and arranged to be heated and to cool proportionately to the heating and cooling of oven 1, and thus form a preheat control device which may be referred to as a thermal image of the oven whose temperature is to be controlled. Thus whenever either one or both of oven heating units 2, 3 are energized, heater 31 is also energized and the thermal mass of the preheat control device is such that the position assumed by bimetallic arm 26 is always a function of the temperature in oven 1.

Contacts 29 and 30 which are carried by movable arms 22 and 24 respectively are movable through a range of positions corresponding to the range of positions in the baking range of control member 4, it being recalled that upon rotation of knob 4 cam 13 is correspondingly rotated and thereby positions cam follower 21 which in turn positions contacts 29 and 30. Since these contacts are shifted downwardly upon rotation of knob 4 in the clockwise direction, contacts 27 and 29 remain in engagement for increasingly long periods of time as the temperature setting of knob 4 is increased. However, as previously explained, the position of bimetallic arm 26 is at all times proportional to the temperature in oven 1, and the entire preheat control assembly is so arranged that arm 26 shifts contacts 27 and 29 out of engagement as the temperature in oven 1 reaches the temperature setting on knob 4. Inasmuch as these contacts are in series with broil unit 3 it will be seen that the broil unit is energized whenever control knob 4 is set in the baking range and the oven temperature is less than the temperature setting of the knob, and that as soon as the desired temperature is reached contacts 27 and 29 open and de-energize broil unit 3.

It should of course be understood that when control knob 4 is rotated to its broil position, cam 13 forces cam follower 21 downwardly to a position in which contacts 27 and 29 remain in engagement regardless of the temperature in oven 1. Thus broiling unit 3 is continuously energized when knob 4 is rotated to the broil position, and preferably bake unit 2 is de-energized by means of contacts 15 and 16 which are separated upon movement of the high portion of cam 8 into engagement with the end of arm 15.

From the foregoing description it should be evident that ordinarily the heat for baking operations in oven 1 is supplied by bake unit 2 under thermostatic control of thermostat 5 in response to oven temperature as sensed by bulb 6. However since it is desirable to raise the temperature of the oven as rapidly as possible, I have provided improved automatic means for temporarily increasing the heat output level until the pre-selected temperature has been reached. Thus by means of knob 4 and cam 13, contact 29 is moved to a position corresponding to the selected baking temperature, and contact 27 remains in engagement therewith, energizing broil unit 3, until bimetallic arm 26 moves to a position corresponding to that particular temperature. When that temperature is reached contacts 27 and 29 disengage and almost immediately thereafter contacts 28 and 30 are closed thus connecting resistor 45 in shunting relationship with heater 31 and reducing its heat output to the minimum value sufficient to maintain contacts 28 and 30 in engagement.

While I have shown and described a specific embodiment of my invention, I do not desire my invention to be limited to the particular arrangement shown and described, and I intend by the appended claims to cover all modifications within the true spirit and scope of my invention.

What I claim as my invention is:

1. An oven heating system comprising first and second heating units, a manually adjustable thermostat for controlling the energization of said first unit in accordance with oven temperature, a control member for said thermostat having a range of positions corresponding to a predetermined range of oven temperatures, a preheat control device for energizing said second heating unit upon movement of said control member to a position corresponding to a temperature higher than the temperature in said oven, said preheat control device comprising a heating element in heat transfer relation with a bimetallic arm, a first contact mounted on said bimetallic arm, a second contact carried by a movable arm and engageable with said first contact, said bimetallic arm being movable away from said movable arm upon energization of said heating element, said heating element being connected in circuit with said second heating unit so as to be energized simultaneously therewith, said contacts being connected in series with said second heating unit so as to control the energization thereof, said preheat control device being constructed and arranged to heat and cool proportionately to the heating and cooling of said oven, and cam means operated by said control member for positioning said movable arm so that said contacts are engaged upon movement of said control member to a position corresponding to a temperature higher than the temperature in said oven, said contacts being disengaged upon movement of said bimetallic arm to a position corresponding to the selected oven temperature.

2. An oven heating system comprising a bake unit, a broil unit, a manually adjustable thermostat for controlling the energization of said bake unit in accordance with oven temperature, a control member for said thermostat having an off position, a range of baking positions corresponding to a predetermined range of baking temperatures, and a broil position, a preheat control device for energizing said broil unit upon movement of said control member to a baking position corresponding to a temperature higher than the temperature in said oven, said preheat control device comprising a heating element in heat transfer relation with a bimetallic arm, a first contact mounted on said bimetallic arm, a second contact carried by a movable arm and engageable with said first contact, said bimetallic arm being movable away from said movable arm so as to disengage said contacts upon energization of said heating element, said heating element being connected in circuit with said broil unit so as to be energized simultaneously therewith, said contacts being connected in series with said broil element so as to control the energization thereof, said preheat control device being constructed and arranged to heat and cool proportionately to the heating and cooling of said oven, and cam means operated by said control member for shifting said movable arm so as to close said contacts upon movement of said control member to a baking position corresponding to a temperature higher than the temperature in said oven, said contacts being opened upon movement of said bimetallic arm to a position corresponding to the selected baking temperature, whereby the preheating cycle is terminated when the temperature in said oven reaches the selected baking temperature.

3. An oven heating system comprising first and second heating units, a manually adjustable thermostat for controlling the energization of said first unit in accordance with oven temperature, a control member for said thermostat having a range of positions corresponding to a predetermined range of oven temperatures, a preheat control device for energizing said second heating unit upon movement of said control member to a position corresponding to a temperature higher than the temperature in said oven, said preheat control device comprising a heating element in heat transfer relation with a bimetallic arm, first and second contacts mounted on opposite sides of said bimetallic arm, a third contact carried by a first movable arm and engageable with said first contact, a fourth contact carried by a second movable arm and engageable with said second contact, said movable arms lying on opposite sides of said bimetallic arm and being secured together so that said third and fourth contacts are spaced a fixed distance apart, said bimetallic arm being movable toward said second movable arm and away from said first movable arm upon energization of said heating element, said heating element being connected in circuit with said second heating unit so as to be energized simultaneously therewith, said first and third contacts being connected in series with said second heating unit and said second and fourth contacts being connected in series with a resistor shunting said heating element so as to reduce the heat output thereof, said preheat control device being constructed and arranged to heat and cool proportionately to the heating and cooling of said oven, and a cam operated by said control member cooperating with a cam follower on said first movable arm arranged to position said movable arms so that said first and third contacts are closed thus energizing said second heating unit upon movement of said control member to a position corresponding to a temperature higher than the temperature in said oven, said first and third contacts being opened and said second and fourth contacts being closed upon movement of said bimetallic arm to a position corresponding to the selected oven temperature.

4. An oven heating system comprising a bake unit, a broil unt, a manually adjustable thermostat for controlling the energization of said bake unit in accordance with oven temperature, a control member for said thermostat having an off position, a range of baking positions corresponding to a predetermined range of baking temperatures, and a broil position, a preheat control device for energizing said broil unit upon movement of said control member to a baking position corresponding to a temperature higher than the temperature in said oven, said preheat control device comprising a heating element in heat transfer relation with a bimetallic arm, first and second contacts mounted on opposite sides of said bimetallic arm, a third contact carried by a first movable arm and engageable with said first contact, a fourth contact carried by a second movable arm and engageable with said second contact, said movable arms lying on opposite sides of said bimetallic arm and being secured together so that said third and fourth contacts are spaced a fixed distance apart, said bimetallic arm being movable toward said second movable arm and away from said first movable arm upon energization of said heating element, said heating element being connected in circuit with said broil element so as to be energized simultaneously therewith, said first and third contacts being connected in series with said broil element and said second and fourth contacts being connected in series with a resistor shunting said heating element so as to reduce the heat output thereof, said preheat control device being constructed and arranged to heat and cool proportionately to the heating and cooling of said oven, and a cam operated by said control member cooperating with a cam follower on said first movable arm arranged to position said movable arms so that said first and third contacts are closed thus energizing said broil unit upon movement of said control member to a baking position corresponding to a temperature higher than the temperature in said oven, said first and third contacts being opened and said second and fourth contacts being closed upon movement of said bimetallic arm to a position corresponding to the selected baking temperature, whereby the preheating cycle is terminated and thereafter the temperature in the oven is maintained by the bake unit so long as the position of said control member remains unchanged.

5. An oven heating system comprising a bake unit, a broil unit, a manually adjustable thermostat for controlling the energization of said bake unit in accordance with oven temperature, a control member for said thermostat having an off position, a range of baking positions corresponding to a predetermined range of baking temperatures, and a broil position, a pair of normally closed switch contacts in series with said bake unit operable to open position upon movement of said control member to its broil position, a pair of normally closed contacts in series with said broil unit operable to open position upon movement of said control member to its off position, a preheat control device for energizing said broil unit upon movement of said control member to a baking position corresponding to a temperature higher than the temperature in said oven, said preheat control device comprising a heating element in heat transfer relation with a bimetallic arm, first and second contacts mounted on opposite sides of said bimetallic arm, a third contact carried by a first movable arm and engageable with said first contact, a fourth contact carried by a second movable arm and engageable with said second contact, said movable arms lying on opposite sides of said bimetallic arm and being secured together so that said third and fourth contacts are spaced a fixed distance apart, said bimetallic arm being movable toward said second movable arm and away from said first movable arm upon energization of said heating element, said heating element being connected in circuit with said broil unit so as to be energized simultaneously therewith, said first and third contacts being connected in series with said broil unit and said second and fourth contacts being connected in series with a resistor shunting said heating element, the resistance of said resistor being such that the heat output of said heating element may be reduced thereby to the minimum value sufficient to maintain said second and fourth contacts in engagement, said preheat control device being constructed and arranged to heat and cool proportionately to the heating and cooling of said oven, and a cam operated by said control member cooperating with a cam follower on said first movable arm arranged to position said movable arms so that said first and third contacts are closed thus energizing said broil unit upon movement of said control member to a baking position corresponding to a temperature higher than the temperature in said oven, said first and third contacts being opened and said second and fourth contacts being closed upon movement of said bimetallic arm to a position corresponding to the selected baking temperature, whereby the preheating cycle is terminated and the heat output of said heating element is reduced to said minimum value sufficient to maintain said second and fourth contacts in engagement.

References Cited in the file of this patent

UNITED STATES PATENTS

| | | |
|---|---|---|
| 2,210,947 | Myers et al. | Aug. 13, 1940 |
| 2,276,930 | Clark | Mar. 17, 1942 |
| 2,399,423 | Bletz | Apr. 30, 1946 |
| 2,434,467 | McCormick | Jan. 13, 1948 |
| 2,641,681 | Willman | June 9, 1953 |